UNITED STATES PATENT OFFICE 2,358,031

SUBSTITUTED THIADIAZOLES

Richard O. Roblin, Jr., and Philip Stanley Winnek, Stamford, Conn., assignors to American Cyanamid Company, New York, N. Y., a corporation of Maine No Drawing. Application February 28, 1940, Serial No. 321,284

4 Claims. (Cl. 260—239.6)

This invention relates to a new class of chemical compounds, namely p-arylene sulfonamido thiadiazoles and more particularly it relates to the class of compounds which are represented by the following general formula:

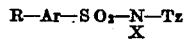

wherein R represents a nitro, amino, or substituted amino group such as alkylamino, acylamino, mono-aldose amino, sodium formaldehyde sulfoxylate amino and the like. Ar stands for a p-arylene or p-arylene sulfonamido p-arylene group, X is either hydrogen, a metal or lower alkyl radical and Tz is thiadiazole or substituted thiadiazole united through a carbon atom of the thiadiazole ring to the nitrogen atom of the sulfonamido group. The substituted thiadiazoles include the compounds in which the hydrogen on the carbon atom not attached to the sulfonamido group is replaced by a nitro, amino, halogen, alkyl, aryl, aralkyl, cycloaliphatic, alkoxy, hydroxy, carboxylic, sulfonic, or similar radicals and also acid or metal salts when the above radical is a salt-forming constituent.

The present invention is not limited to any particular process of preparing the new compounds. We have found, however, that good yields of the compounds in which R is a nitro radical are obtained by reacting the aminothiadiazole with a p-nitrobenzene sulfonyl chloride suspended in a suitable organic solvent such as pyridine, dioxane or the like, at a slightly elevated temperature and after completion of the reaction neutralizing with an alkali metal hydroxide to form a precipitate of the p-nitrobenzene sulfonamido thiadiazole which can then be purified by crystallization from a suitable solvent.

The corresponding p-acylaminobenzene sulfonamido thiadiazoles are prepared by a similar process when a p-acylaminobenzene sulfonyl chloride is employed as one of the reactants instead of the p-nitrobenzene sulfonyl chloride. The p-acetylaminobenzene sulfonyl chloride is usually employed in the above reaction, due to its being relatively cheap and to the fact that it can easily be hydrolyzed to the p-amino compound. When, however, p-acyl compound is desired as the final product, various other acyl radicals such as butyryl, benzoyl, nicotinyl, and the like may be employed instead of the acetyl radical.

The sulfanilamido thiadiazoles can either be prepared by reducing the corresponding nitro compound or by hydrolyzing the corresponding acyl compound.

The p-arylene sulfonamido-p-arylene compounds can be prepared by reacting the corresponding sulfanilamido thiadiazole with N-acetyl sulfanilyl chloride.

The amino thiadiazoles used as intermediates in the above processes may be any one of the following isomers, in which the linkages are as follows: 5-amino-1,2,4 thiadiazole

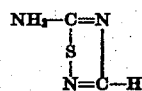

3-amino-1,2,4 thiadiazole

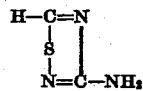

2-amino-1,3,4 thiadiazole

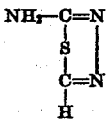

5-amino-1,2,3 thiadiazole

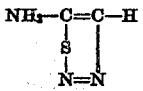

4-amino-1,2,3 thiadiazole

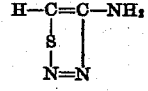

or 3-amino-1,2,5 thiadiazole

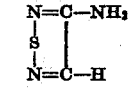

The hydrogen atom on the 2, 3, 4 and 5 carbon atoms respectively, may of course be replaced by the various substituents as indicated in the general formula above.

Many of the compounds of this invention are useful as therapeutic agents and have been found to be active against gram negative, intestinal pathogenic organisms such as dysentery bacilli, typhoid and paratyphoid bacilli and the like. They are also useful as intermediates in the preparation of other chemical compounds, such as for example, azo dyes.

The invention will be described in greater detail in connection with the following specific examples which are merely illustrative of the preferred method of preparing certain representative compounds and not intended to limit the scope of the invention. The parts in the examples are by weight except in the case of liquids which are corresponding parts by volume.

EXAMPLE 1

2-(sulfanilamido)-1,3,4 thiadiazole

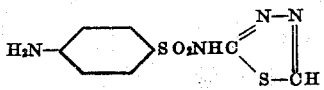

Sixteen and one-half parts (0.163 mol) of 2-amino-1,3,4 thiadiazole was covered with 43 parts of anhydrous pyridine. To the mixture was added 50 parts (0.214 mol) of p-acetylaminobenzene sulfonyl chloride with vigorous shaking at 50°-60° C. The reaction mixture was then heated to 125° C. When the mixture had cooled somewhat it was placed in a Claisen flask and 27.6 parts (0.69 mol) of sodium hydroxide dissolved in 110 parts of water was added through a dropping funnel while distilling off a mixture of pyridine and water. The distillation was stopped when the temperature reached 100° C. and the residual liquor in the flask heated at 95° C. for 30 minutes.

The reaction mixture was then poured into 1650 parts of hot water, the pH adjusted to 8-9, decolorizing charcoal was added and the whole was heated on the steam for 15 minutes. The charcoal was filtered off and the hot filtrate neutralized and cooled. The 2-(sulfanilamido)-1,3,4 thiadiazole was purified by repeated crystallization from boiling water.

EXAMPLE 2

Sodium formaldehyde sulfoxylate derivative

The sodium formaldehyde sulfoxylate derivative of 2(sulfanilamido)-1,3,4 thiadiazole is prepared by reacting it with a slight excess of sodium formaldehyde sulfoxylate in glacial acetic acid and precipitating the product with dry ether. It is readily soluble in water.

EXAMPLE 3

Sodium salt of 2(sulfanilamido)-1,3,4 thiadiazole

The sodium salt is prepared by adding 2-(sulfanilamido)-1,3,4 thiadiazole to the equivalent amount of sodium hydroxide dissolved in a very small volume of water. The mixture is warmed on a steam bath until solution is complete. Absolute alcohol is then added and the sodium salt is precipitated as a white crystalline material. It is readily soluble in water.

Other alkali metal salts can be prepared in a similar manner by using the appropriate alkaline hydroxide.

Salts of heavy metals, as for example the copper, gold, lead and iron salts, may be formed by reacting the alkali metal salts in aqueous solution with a suitable soluble salt of the metal desired. The desired product is obtained usually as a precipitate.

EXAMPLE 4

Mono-aldose derivatives of 2(sulfanilamido)-1,3,4 thiadiazole

The sugar derivatives are prepared by refluxing 2-(sulfanilamido)-1,3,4 thiadiazole with a mono-aldose sugar such as glucose or galactose, in ethanol. The materials gradually go into solution and on cooling the alcoholic solution, the sugar derivative crystallizes out. They are quite soluble in water.

EXAMPLE 5

2-(p-nitrobenzene sulfonamido)-1,3,4-thiadiazole

One part (0.01 mol) of 2-aminothiadiazole was mixed with 3 parts of anhydrous pyridine and cooled. To the mixture was added 2 parts (0.009 mol) of p-nitrobenzene sulfonyl chloride with thorough stirring. The reaction mixture was heated on a steam bath and then allowed to cool at room temperature. Upon dilution with water the p-nitrobenzene sulfonamido thiadiazole precipitated and was filtered off. It was recrystallized from nitromethane. The 2-sulfanilamido-1,3,4-thiadiazole described in Example 1 may be obtained by iron reduction of the nitro compound (see Example 7).

EXAMPLE 6

2-(p-nitrobenzene sulfonamido)-5-methyl-1,3,4-thiadiazole

To 17.2 parts (0.15 mol) of 2-amino-5-methyl-1,3,4-thiadiazole was added 45 parts of anhydrous pyridine. 37.6 parts (0.17 mol) of p-nitrobenzene sulfonyl chloride was then added gradually with vigorous agitation. The reaction mixture was then heated on a steam bath for one hour. After cooling the 2-(p-nitrobenzene sulfonamido)-5-methyl-1,3,4-thiadiazole was separated by the addition of ice water. Further quantities of product were obtained by concentrating the pyridine-water mixture until most of the pyridine was removed.

EXAMPLE 7

2-sulfanilamido-5-methyl-1,3,4-thiadiazole

The 2-(p-nitrobenzene sulfonamido)-5-methyl-1,3,4-thiadiazole obtained in the preceding example was added gradually to a hot suspension of 50 parts of iron dust in 200 parts of 95% ethanol containing 2 parts of hydrochloric acid (1:1). The reaction mixture was heated on a steam bath with good agitation for 8 hours. It was then neutralized with dilute sodium hydroxide and filtered hot. On addition of water the crude 2-sulfanilamido-5-methyl-1,3,4-thiadiazole separated. It was purified by recrystallization from water.

EXAMPLE 8

2-(p-nitrobenzene sulfonamido)-5-phenyl-1,3,4-thiadiazole

To 17.7 parts (0.1 mol) of 2-amino-5-phenyl-1,3,4-thiadiazole was added 60 parts of anhydrous pyridine. 26.5 parts (0.12 mol) of p-nitrobenzene sulfonyl chloride was added to the resulting mixture gradually with stirring. The reaction mixture was then heated on the steam bath for 3 hours. After cooling the 2-(p-nitrobenzene sulfonamido)-5-phenyl-1,3,4-thiadiazole was separated by the addition of ice water.

EXAMPLE 9

2-sulfanilamido-5-phenyl-1,3,4-thiadiazole

The nitro compound from the preceding example was added gradually to a hot suspension of 40 parts of iron dust in 250 parts of 95% alcohol containing 2 parts of hydrochloric acid (1:1). The reaction mixture was heated on a steam bath with good agitation for 18 hours. It was then neutralized with dilute sodium hydroxide and filtered hot. The residue was extracted with three 200 part portions of hot 95% alcohol. On addition of water to the alcohol solution the 2-sulfanilamido-5-phenyl-1,3,4-thiadiazole separated. It was purified by recrystallization from an alcohol-water mixture.

We claim:

1. Sulfanilamidothiadiazoles having the following formula:

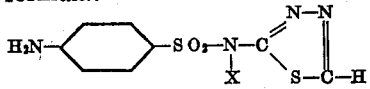

in which X is a member of the group consisting of hydrogen and metals prepared for use as a therapeutic.

2. Compounds represented by the following formula:

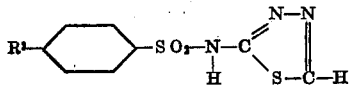

in which R³ represents a sodium formaldehyde sulfoxylate amino radical prepared for use as a therapeutic.

3. 2-sulfanilamido-5-methyl - 1,3,4-thiadiazole prepared for use as a therapeutic.

4. Compounds of the group consisting of those having the following formula:

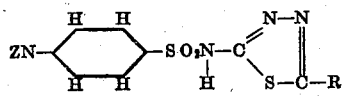

in which ZN is a radical of the group consisting of $NH_2$, groups reducible thereto, and groups hydrolyzable thereto; and R is taken from the group consisting of alkyl hydrocarbon and phenyl radicals and salts thereof, prepared for use as therapeutic agents.

RICHARD O. ROBLIN, JR.
PHILIP STANLEY WINNEK.